United States Patent
Hirabayashi et al.

(10) Patent No.: US 8,164,467 B2
(45) Date of Patent: Apr. 24, 2012

(54) POWER SAVING MODE FOR REMOTE CONTROLLER

(75) Inventors: Yoshi Hirabayashi, San Diego, CA (US); Peter Shintani, San Diego, CA (US)

(73) Assignees: Sony Corporation, Tokyo (JP); Sony Electronics, Inc, Park Ridge, NJ (US)

( * ) Notice: Subject to any disclaimer, the term of this patent is extended or adjusted under 35 U.S.C. 154(b) by 473 days.

(21) Appl. No.: 12/200,239

(22) Filed: Aug. 28, 2008

(65) Prior Publication Data

US 2010/0052925 A1 Mar. 4, 2010

(51) Int. Cl.
*G06B 21/00* (2006.01)
*G06F 15/16* (2006.01)

(52) U.S. Cl. ............... 340/636.1; 709/231

(58) Field of Classification Search ............ 709/231; 340/825.22

See application file for complete search history.

(56) References Cited

U.S. PATENT DOCUMENTS

| | | | |
|---|---|---|---|
| 5,920,270 A * | 7/1999 | Peterson | 340/825.37 |
| 6,532,592 B1 | 3/2003 | Shintani et al. | |
| 6,999,062 B2 | 2/2006 | Hara et al. | |
| 7,505,795 B1 * | 3/2009 | Lim et al. | 455/574 |
| 2004/0176065 A1 | 9/2004 | Liu | |
| 2005/0097594 A1 * | 5/2005 | O'Donnell et al. | 725/15 |
| 2005/0216519 A1 * | 9/2005 | Mayo et al. | 707/200 |
| 2006/0242420 A1 * | 10/2006 | Rodriguez et al. | 713/182 |
| 2007/0037610 A1 | 2/2007 | Logan | |
| 2009/0259939 A1 * | 10/2009 | Lockett et al. | 715/716 |
| 2009/0320076 A1 * | 12/2009 | Chang | 725/60 |
| 2010/0043027 A1 * | 2/2010 | Shintani et al. | 725/40 |

OTHER PUBLICATIONS

Micromodul LX2 User Manual Version 2, info@faderfox.de, Jan. 1, 2007, p. 7.
Smartlink SX, www.phonak.com, Mar. 8, 2004, Appendix A.
Smarthome SR-525, www.smarthome.com, May 1, 2001, p. 51.

* cited by examiner

*Primary Examiner* — Benjamin C Lee
*Assistant Examiner* — Cal Eustaquio

(57) ABSTRACT

A method, system and apparatus provide for enhanced power savings of a remote controller. Power savings are achieved by automatically entering a power saving mode of the remote controller, based upon user usage of the remote controller. A usage condition associated with use of the remote controller is detected; the usage condition has associated with it a predetermined period of time. Upon detection of the occurrence of the usage condition, the remote controller automatically enters a power saving mode from its normal operational mode after the predetermined period of time of the usage condition.

29 Claims, 6 Drawing Sheets

POWER SAVING MODE FOR REMOTE CONTROLLER

COPYRIGHT NOTICE

A portion of the disclosure of this patent document may contain material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Today's remote controllers, also known as remotes, remote commanders or the like, are used to remotely control any manner of electronic devices, including television sets, cellular telephones, set-top boxes, etc. Remote controllers have become more complex, with processors suitable for supporting processing tasks; they routinely take more time to start up and shut down. They also must be more responsive to the user, providing more opportunities for interaction with the user via the user interface (display, keypad) of the remote controller.

As the capabilities of remote controllers have become more sophisticated, particularly as regards the bi-directional interaction between a user and the remote controller via a user interface, the attendant power consumption and drain on power batteries present a real issue. The power required to maintain a fully operational mode, as well as the time to power-up and power-down from a sleep or hibernate mode, provide an incentive to intelligently determine the timing of entry into and exit from energy saving power consumption modes of the remote controller.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Figure 1:
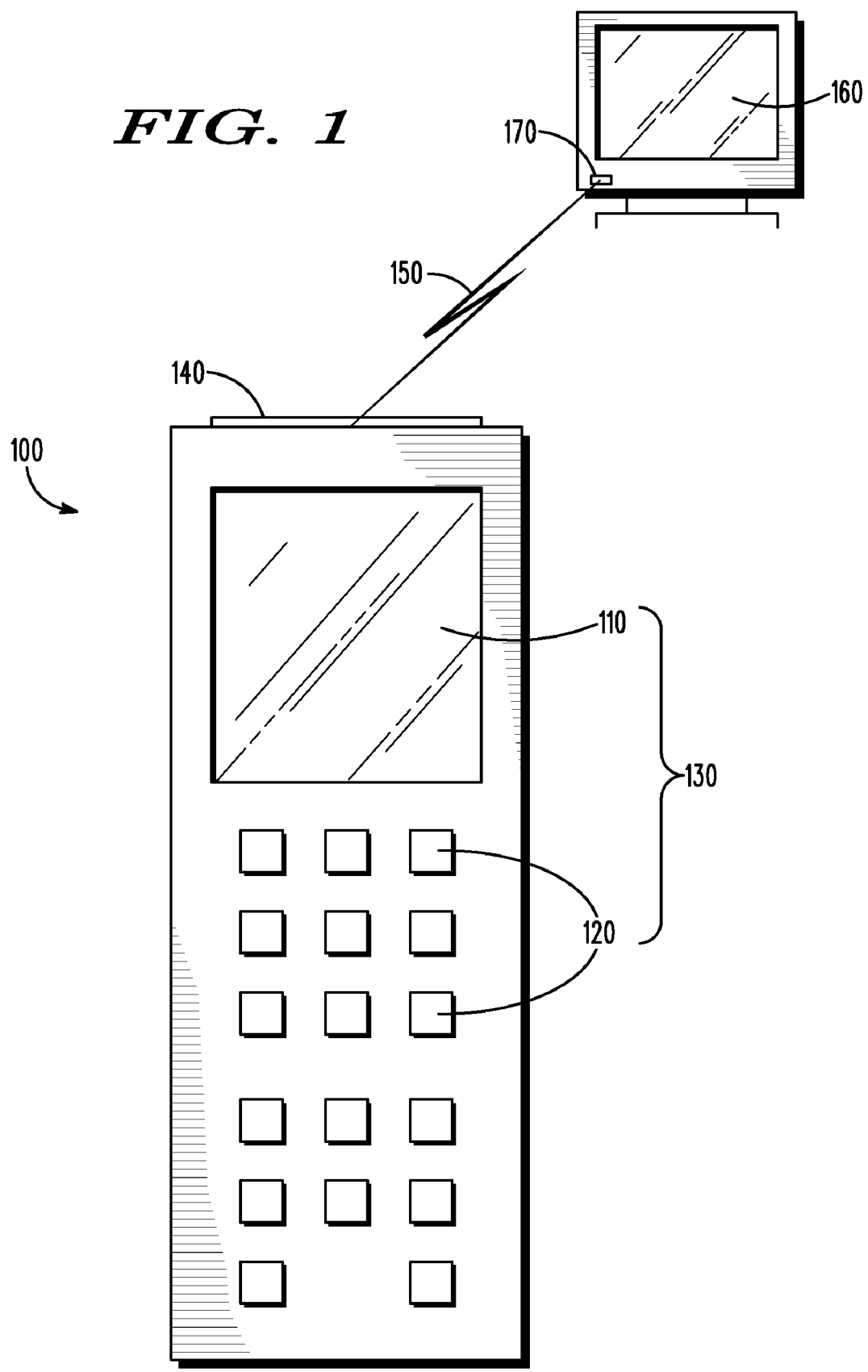
FIG. 1 is a block diagram of a system, in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with embodiments of the present invention, power savings of a remote controller or commander device is achieved by automatically entering a power saving mode of the remote controller, based upon user usage of the remote controller. A usage condition associated with use of the remote controller is detected; the usage condition has associated with it a predetermined period of time. Upon detection of the occurrence of the usage condition, the remote controller automatically enters a power saving mode from its normal operational mode after the predetermined period of time of the usage condition. The remote controller encompasses any device that is trying to conserve power and has a user interface that is frequently accessed by the user to control a remote electronic device; thus, embodiments are applicable to cellular telephones, as well as televisions, for example.

The remote controller, useful for remote control of an electronic device such as television, control peripheral devices coupled to the television set (such as video cassette recorders, video disk players and audio equipment), a personal digital assistant (PDA), a cellular or mobile phone, portable media players or the like, has a user interface through which a user may remotely control operation of the electronic device(s); a processor and control element that processes instructions received from the user via the user interface and generates control signals in accordance with those instructions; a receiver that receives signals from the electronic device(s) and provides those received signals to the processor and control element; and a transmitter that transmits the control signals generated by the processor and control element to the electronic device(s) under control of the processor and control element. In response to detecting a usage condition associated with use of the remote controller, the processor and control element cause the remote controller to automatically enter a power saving mode a predetermined period of time determined by the usage condition.

A user may have a usage pattern or condition associated with his use of the remote controller to control operation of the electronic device(s). The remote controller may be used for several seconds to make changes and then it will be idle; certain embodiments provide for the remote controller to automatically go into its power saving mode, such as an energy conserving standby mode, after a period of time after the last usage of the remote control by the user, such as after a last key entry. Depending upon the user, the period between key presses, for example, may vary widely, and if the remote controller goes into a sleep, hibernate, or other power saving mode too quickly, it would be more of an inconvenience and waste more power on the start-up than if the remote controller had remained in its normal operating mode. Thus, the length of the predetermined period of time associated with a particular usage condition or pattern may be programmed or dynamically changed accordingly. For example, one user may make entries a couple of seconds apart, but another user might make entries into the remote controller 30 seconds apart. The remote controller can adapt to these varying usage patterns and conditions by effective use of the predetermined period of time associated with a user (a user may be assigned or mapped to a certain button, for example) or a usage condition or pattern. As used herein, usage condition and usage pattern may be similarly construed. It is noted, however, that a usage condition may not in fact be a pattern; but patterns may be considered a form of usage condition. For example, a usage condition of the time of the day is a condition but not itself a pattern.

The usage condition may be of varying types, including programmed usage patterns and customized usage patterns, which may be selected and defined by a user of the remote controller through appropriate manipulation of the remote controller user interface, or the usage condition may be a pre-defined condition automatically recognized by the remote controller.

Moreover, the usage pattern or condition may refer to a period of inactivity as well as activity/usage of the remote controller. Thus, the predetermined period of time after which the remote controller enters the power saving mode may be triggered by a period of inactivity; this length of time may be variable and dynamically defined, just as is the case with certain affirmative actions or activity by the user.

Figure 2:
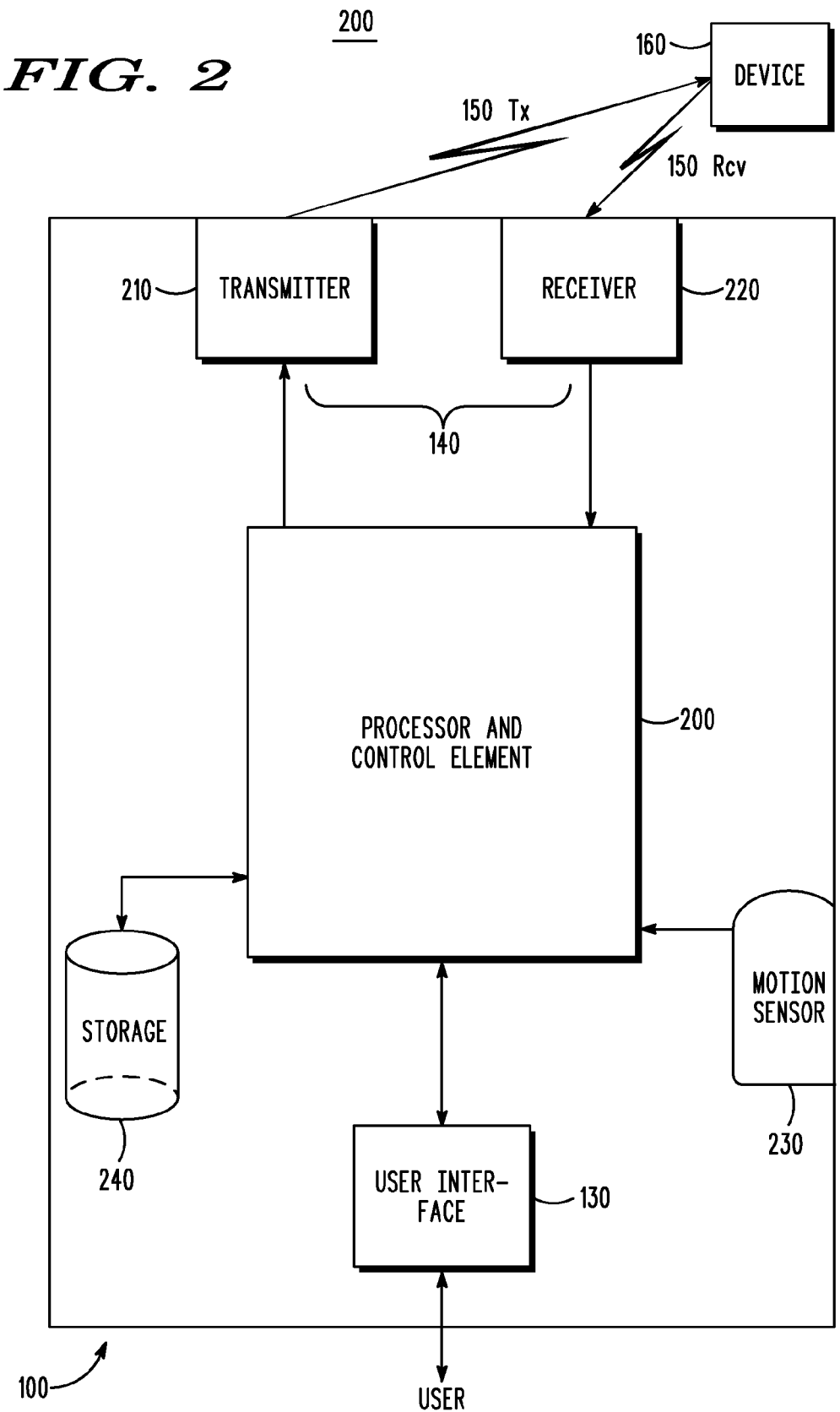
FIG. 2 is a functional block diagram of a remote controller, in accordance with various embodiments.
Figure 3:
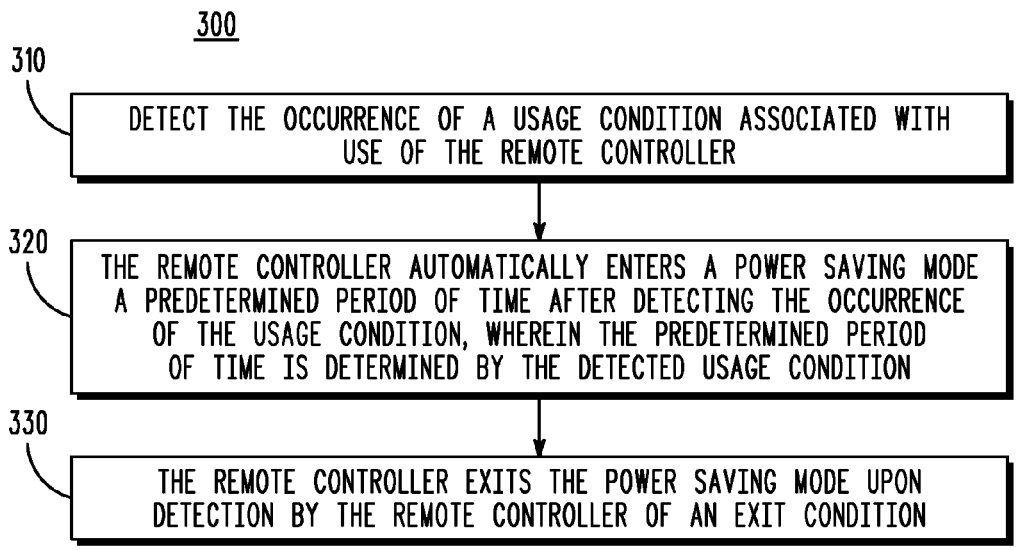
FIGS. 3-7 are flowcharts, illustrative of methods in accordance with various embodiments.

Using the drawings, the various embodiments of the present invention, including preferred embodiment(s) will now be explained. As shown in the system of FIG. 1, the present invention includes a remote controller 100, also referred to as a remote controller, remote commander or the like, and an electronic device 160 controlled by the remote controller 100; the electronic device may be a television set, a PDA, a cellular telephone or other devices operable to be remotely controlled by remote controller 100. The communications link 150 between the remote controller 100 and the electronic device 160 maybe a bi-directional, two-way link during a normal operating mode of operation. Bi-directional communications is commonly used in audio applications, LCD, OLED and LED screens, etc. The functional block diagram of the remote controller 100 of FIG. 2 illustrates the functional relationship between the user interface, processor and control element, transmitter and receiver elements.

The remote controller 100 has a user interface 130 by which the user may send and receive information. The user interface features a display 110, for example a liquid crystal display (LCD), on which data and information received from the electronic device or input using the keypad 120 may be displayed. For example, in the case of a television as the electronic device, the display 110 may display a menu or program guide. Such information can assist a viewer in navigating among the wide variety of available programming. For example, electronic program guides that are displayed on a particular channel are common in cable and satellite systems as a way of informing viewers as to what programming is being shown.

The user interface also features a plurality of keys or buttons 120 with which a user can enter instructions to be sent to the electronic device 160 or instructions to be received by the processor and control element 200 of the remote controller of FIG. 2, as will be described.

The communications unit 140 of the remote controller 100 includes a transmitter 210 and a receiver 220 for both sending and receiving data signals from the electronic device 160, illustrated in this embodiment by way of example and not limitation as a television set. The electronic device 160 is equipped with a similar communications unit 170 which includes both a receiver and a transmitter for receiving signals from the remote controller 100 and transmitting signals to the remote controller. The signaling between the electronic device 160 and the remote controller 100 may be any appropriate type of signaling. For example, infra-red (IR), radio-frequency (RF), ultra-sonic signaling, or combinations thereof are all acceptable and equivalent methods of transmitting data between the electronic device 160 and the remote controller 100. As mentioned, during normal operation, there is a two-way communications link between the electronic device 160 and the remote controller 100. As will be described, during a power saving mode of the remote controller, the two-way communications link may be abridged, as may other functional aspects of the remote controller in order to conserve power, particularly battery power.

As described and shown in FIGS. 1 and 2, the remote controller 100 has a user interface 130 through which a user may remotely control operation of the electronic device(s); a processor and control element 200 that processes instructions received from the user via the user interface and generates control signals in accordance with those instructions; a receiver 220 of the remote controller communications unit 140 that receives signals from the electronic device(s) and provides those received signals to the processor and control element; and a transmitter 210 of communications unit 140 that transmits the control signals generated by the processor and control element to the electronic device(s) under control of the processor and control element. In response to detecting a usage condition associated with use of the remote controller, the processor and control element cause the remote controller to automatically enter a power saving mode a predetermined period of time determined by the usage condition.

FIGS. 3-7 illustrate flows for conserving power of a remote controller in accordance with various embodiments. Referring now to flow 300 of FIG. 3, at Block 310, the occurrence of a usage condition associated with use of the remote controller is detected. A usage condition is a condition tied to, caused by or otherwise affected by the use or non-use of the remote controller by one or more users. A usage condition may be considered to be a usage pattern created by usage of the remote control by one or more users. By way of example and not limitation, the following are types of usage conditions or patterns, tied to use or non-use of the remote controller by the user:

a user pressing a key of the remote controller, with the predetermined period of time determined by a function of the key pressed by the user of the remote controller.

a last key press made by a user of the remote controller, with the remote controller automatically entering the power saving mode a predetermined period of time after the last key press made by the user of the remote controller is detected. (as in Block 320)

a user pressing a sequence of keys of the remote controller.

the elapsed time between key presses; this may indicate "channel surfing", for instance.

the user pressing at least one of one or more trigger keys. For example, a mute button may be a trigger key.

the user waiting at least a predetermined elapsed time between pressing one or more keys of the remote controller a key of the keypad of the user interface being persistently pressed for a minimum period of time; this may denote that the key is "stuck" or inadvertently being sat on by a user (stuck under a cushion, perhaps). Entering the power saving mode in such a condition will greatly reduce battery power unnecessarily expended.

Usage conditions or patterns may optionally not be directly tied to action or inaction on the part of a user of the remote controller. Such is the case in the following, where:

the usage condition is defined by a time of day the user uses the remote controller.

the usage condition is defined by programming viewed by the user of the remote controller.

The remote controller being out of range of the television or other electronic device may render a hibernate or sleep mode desirable in order to conserve battery power of the remote controller.

A usage condition or pattern has associated with it a predetermined period of time after which the remote controller will automatically enter the power saving mode. As a usage condition or pattern may be unique to a particular user or users of the remote controller, it is envisioned that the predetermined periods of time associated with various usage conditions or patterns may accordingly be unique as well.

Referring back to FIG. 3, at Block 320, the remote controller automatically enters a power saving mode a predetermined period of time after detecting the occurrence of the usage condition, wherein the predetermined period of time is determined by the detected usage condition. As previously mentioned, a usage condition or pattern has associated with it a predetermined period of time after which the remote controller will automatically enter the power saving mode. At Block 330, the remote controller exits the power saving mode upon the occurrence and detection by the remote controller of an exit condition. An exit condition may be a user pressing a key or sequence of keys of the key pad of the user interface of the remote controller. An exit condition may alternately be motion of the remote controller detected by a motion sensor 230 of the remote controller.

During the power saving mode, which may be a sleep or hibernate mode of the remote controller, functionality of the remote controller may be reduced or abridged in order to conserve battery power of the remote controller during the power saving mode. For instance, the two-way communications link between the remote controller and the electronic device may be reduced to one-way link only. Other functionality that might be reduced is that the volume of the electronic device might be reduced, in keeping with the "sleep" or "hibernate" aspect of the power saving mode. As previously mentioned, as remote controllers have become more complex, with processors suitable for supporting processing tasks, they routinely take more time to start up and shut down. The sleep mode may be preferred rather than a full start up and shut down from a hibernate mode.

Figure 4:
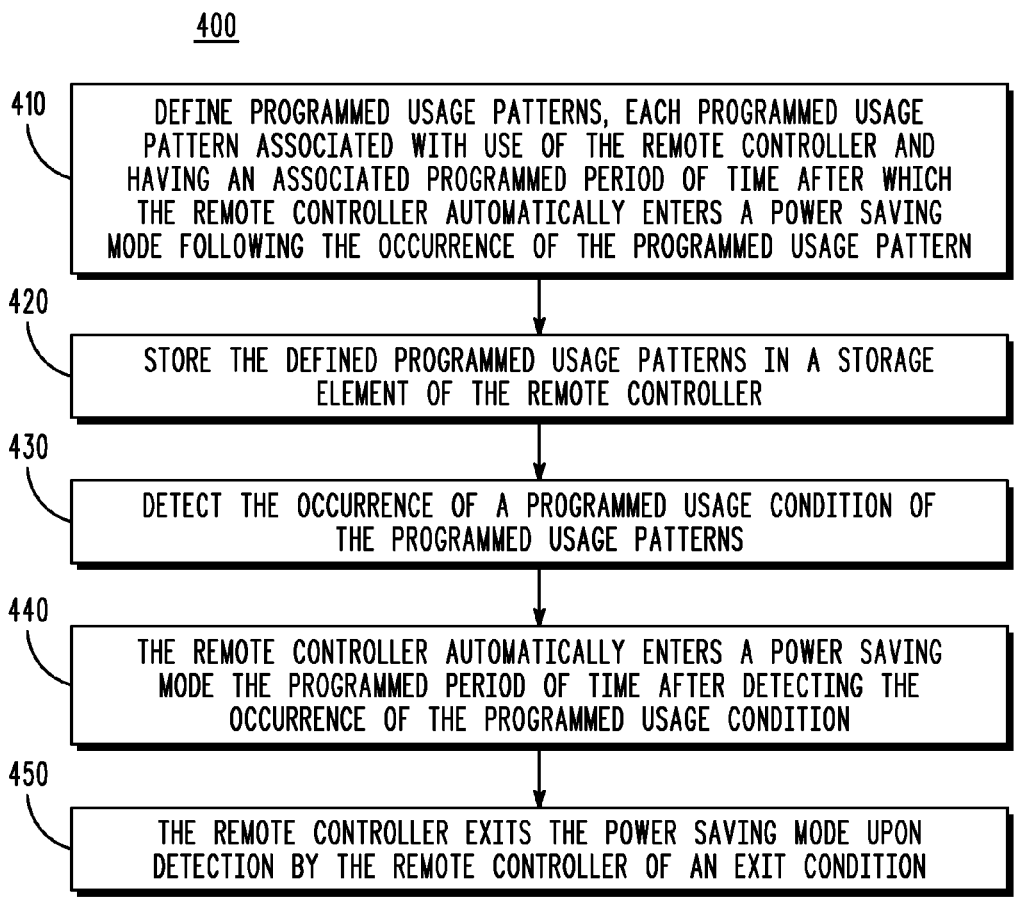
Figure 5:
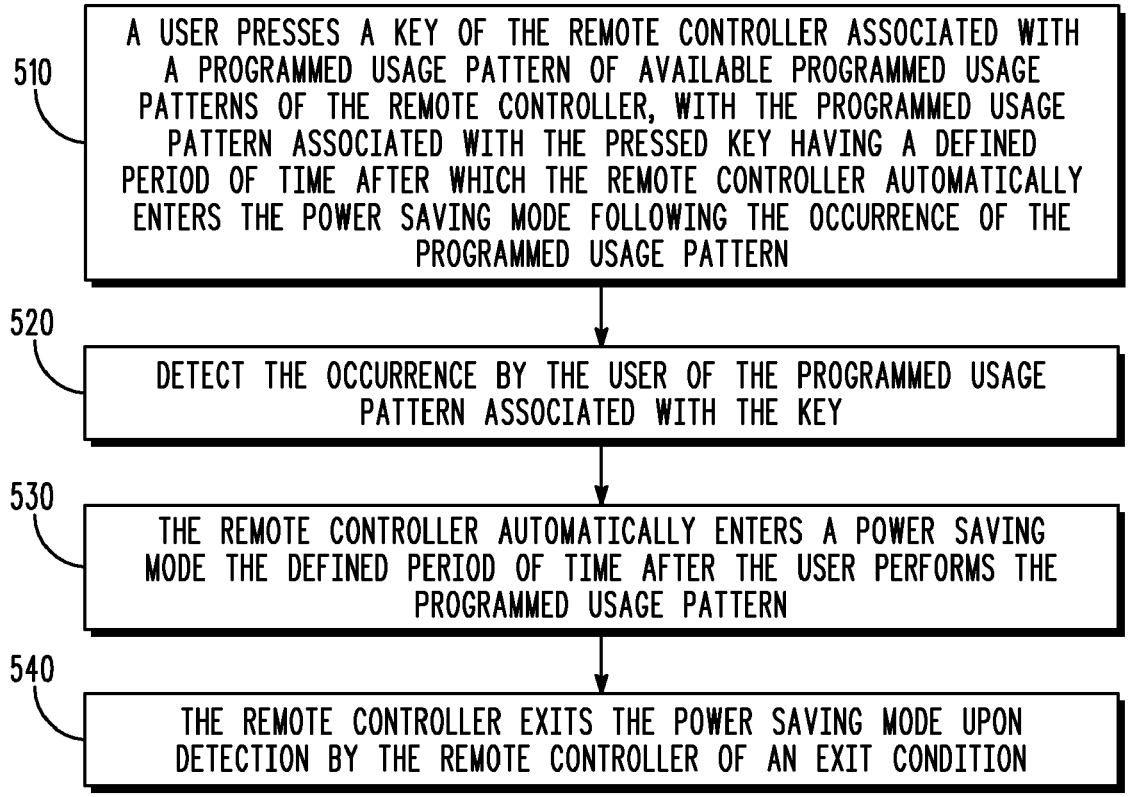

Various embodiments envision the use of programmed usage patterns or conditions, as illustrated in FIGS. 4 and 5. Referring now to flow 440 of FIG. 4, at Block 410 programmed usage patterns associated with use or non-use of the remote controller by a user are defined; again each programmed usage pattern has an associated programmed period of time after which the remote controller automatically enters a power saving mode following the occurrence of the programmed usage pattern. At Block 420, the defined programmed usage patterns are stored in a storage element 240 of the remote controller. The occurrence of a programmed usage condition of the programmed usage patterns is detected at Block 430. AT Block 440, the remote controller automatically enters a power saving mode the programmed period of time after detecting the occurrence of the programmed usage condition. It is noted that defining and storing the programmed usage patterns may occur prior to use of the remote controller by the user. Such might be the case, for example, where the remote controller comes pre-programmed before it is sold to the user. For instance, a user may press a key of the remote controller associated with a programmed usage pattern of a number of programmed usage patterns, with the programmed usage pattern associated with the pressed key having its own unique a defined period of time after which the remote controller automatically enters the power saving mode following the occurrence of the programmed usage pattern. At Block 450, the remote controller exits the power saving mode upon detection by the remote controller of an exit condition.

Referring now to flow 500 of FIG. 5, at Block 510 a user presses a key of the remote controller associated with a programmed usage pattern of available programmed usage patterns of the remote controller, with the programmed usage pattern associated with the pressed key having a defined period of time after which the remote controller automatically enters the power saving mode following the occurrence of the programmed usage pattern. At Block 520, the occurrence by the user of the programmed usage pattern associated with the key is detected, causing the remote controller to automatically enter a power saving mode the defined period of time after the user performs the programmed usage pattern, at Block 530. At Block 540, the remote controller exits the power saving mode upon detection by the remote controller of an exit condition.

Figure 6:
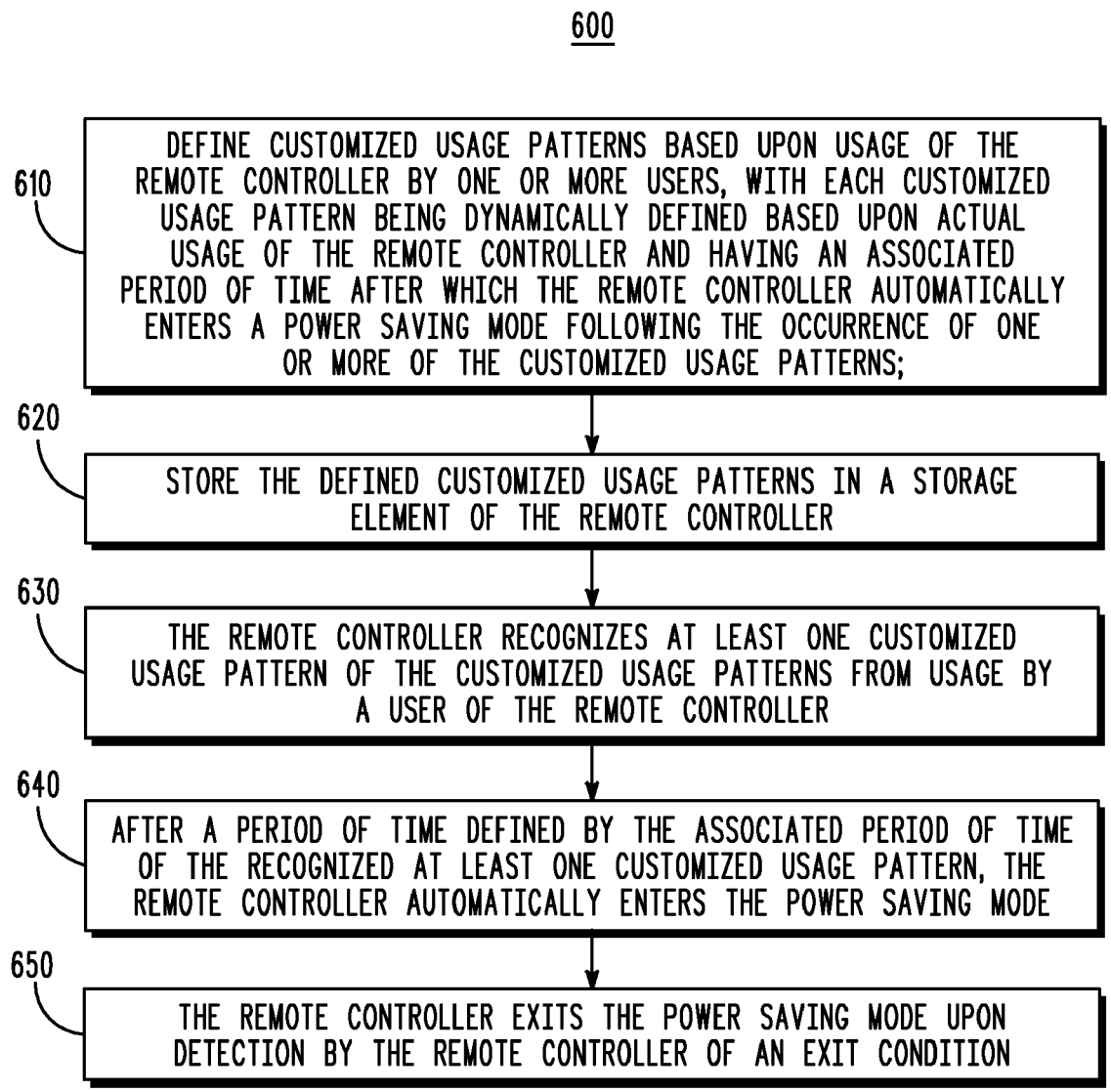
Figure 7:
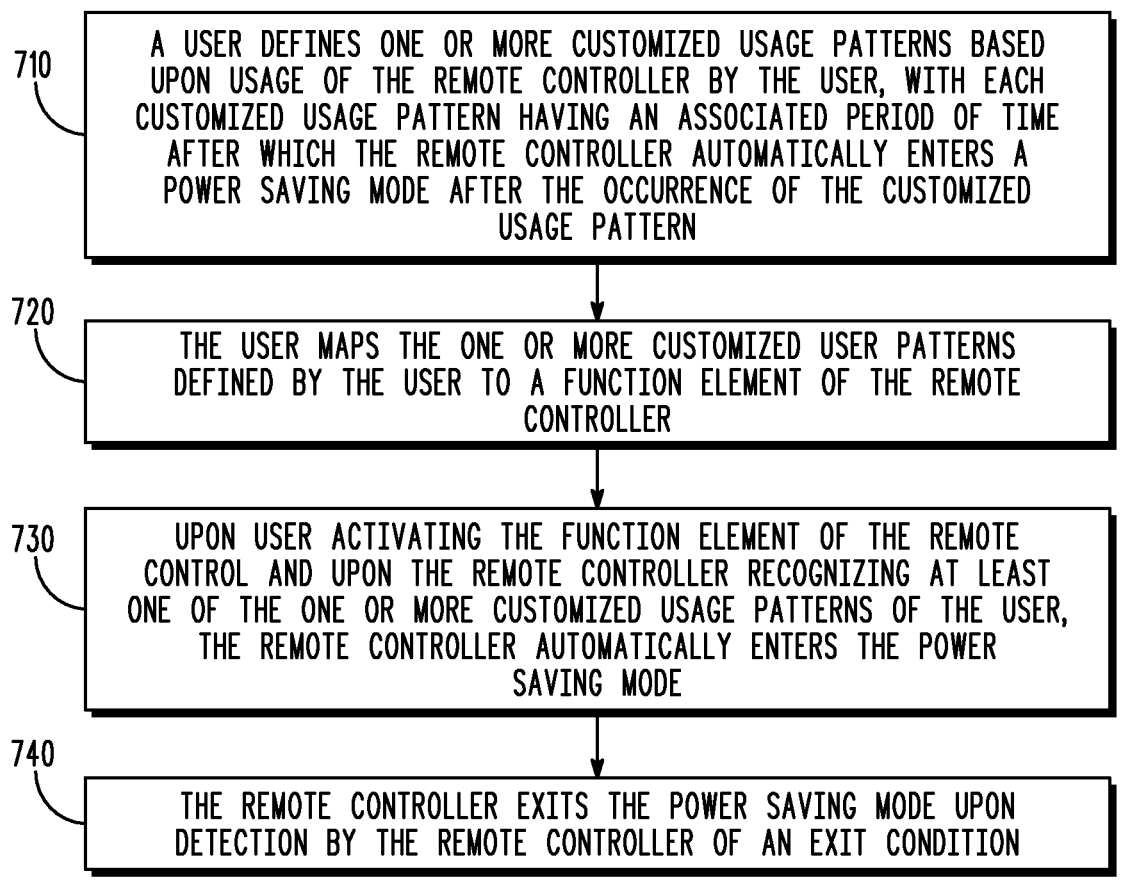

FIGS. 6 and 7 illustrate the use of customized usage conditions or patterns in accordance with various embodiments. Referring now to flow 600 of FIG. 6, at Block 610, one or more customized usage patterns are defined based upon usage of the remote controller by one or more users, with each customized usage pattern being dynamically defined based upon actual usage of the remote controller and having an associated period of time after which the remote controller automatically enters a power saving mode following the occurrence of one or more of the customized usage patterns. At Block 620, these defined, customized usage patterns are stored in a storage element of the remote controller. At Block 630, the remote controller recognizes or detects at least one customized usage pattern of the customized usage patterns from usage by a user of the remote controller. At Block 640, after a period of time defined by the associated period of time of the recognized at least one customized usage pattern, the remote controller automatically enters the power saving mode. The remote controller exits the power saving mode upon detection by the remote controller of an exit condition at Block 650.

Referring now to flow 700 of FIG. 7, at Block 710, a user defines one or more customized usage patterns based upon usage of the remote controller by the user, with each customized usage pattern having an associated period of time after which the remote controller automatically enters a power saving mode after the occurrence of the customized usage pattern. At Block 720, the user can then map the one or more customized usage patterns defined by the user to a function element of the remote controller; the function element is something controllable by the user through the user interface, such as a key or sequence of keys of the keypad. At Block 730, upon the user activating the function element of the remote control and upon the remote controller recognizing at least one of the one or more customized usage patterns of the user, the remote controller automatically enters the power saving mode. The remote controller exits the power saving mode upon detection by the remote controller of an exit condition at Block 740. As previously discussed, the exit condition may be a press of a key of the user interface of the remote controller or motion of the remote controller detected by a motion sensor of the remote controller.

Consider the following example of varying usage patterns in an exemplary household. User 1 likes to watch four different channels in near time, actively channel hopping between them to check scores; his assigned key of the user interface is Button 1. User 2 enjoys video games and cartoon channels, and might be assigned Button 2 at the key of the user interface mapped to them. User 3 enjoys science, cooking and public broadcast programming; she has Button 3. There may be any number of assigned user buttons available to users on the remote controller.

It can be seen that the usage pattern associated with User 1 of Button 1 (the husband) is active channel surfing, perhaps defined as changing channels at least every 5 minutes while actively viewing the sports programming. Upon this pattern NOT being satisfied, such as for instance the husband leaving the room for 15 minutes, the requisite user condition needed for the remote controller to go into a power saving mode is present. The power saving mode may be that the remote controller causes the television to go into a mute condition and the remote controller will go into a hibernate mode. In this example, the predetermined period of time after which the remote control will go into the power saving mode is 15 minutes; of course, this time period could be more or less and may be changed by the user if desired.

Whereas the usage pattern of User 1 was channel surfing, the usage pattern of User 2 is type of programming, i.e. program content, defined as video games and cartoons in this example. Once Button 2, associated with User 2 is pressed, this is the usage condition expected by the remote controller. The predetermined period of time of inactivity after which the remote controller may go into the power saving mode may be 30 minutes, for example. Or, while in the Button 2 mode, watching a type of program not in the cartoon or video game category may be a usage condition that will prompt the remote controller to enter the power saving mode after another predetermined period of time.

With regard to User 3, the usage pattern is again certain programming types, in this case science, cooking and public television. The user may define a period of time after the last channel change, such as 2½ hours, after which the remote controller should go into sleep mode. Another predetermined period of time, such as 30 minutes, may cause the remote controller to go from a bi-directional to a unidirectional mode as well.

Of course, it is understood that the recognition of various usage patterns and conditions may not necessarily be triggered by the activation of certain keys or buttons pre-defined to belong to a particular user. The remote controller, itself, may recognize and respond to various usage patterns and conditions without the necessity of a user-specific key, button or function having been first activated.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using various forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of achieving power saving of a remote controller based upon user usage of the remote controller, comprising:
dynamically defining a plurality of usage patterns associated with use of the remote controller with a corresponding plurality of predetermined periods of time;
detecting the occurrence of a usage condition associated with use of the remote controller by a user, wherein the usage condition comprises one of a plurality of usage conditions,
the remote controller automatically entering a power saving mode a predetermined period of time after detecting the occurrence of the usage condition to enable a power saving mechanism at a specific time as a function of the specific usage pattern associated with the detected usage condition of a specific user, wherein the predetermined period of time is determined by the detected usage condition matching one of the dynamically defined usage patterns and selecting the corresponding predetermined period of time; and
the remote controller exiting from the power saving mode upon detecting an exit condition.

2. The method of claim 1, wherein the usage condition comprises one or more of the user pressing a key of the user interface of the remote controller with the predetermined period of time determined by a function of the key pressed by the user, a last key press of the user interface made by the user of the remote controller with the predetermined period of time occurring after the last key press made by the user is detected, the user pressing a sequence of keys of the user interface of the remote controller, the user pressing at least one of one or more trigger keys of the user interface of the remote controller, the user waiting at least a predetermined elapsed time between pressing one or more keys of the user interface of the remote controller, a time of day the user uses the remote controller, and programming viewed by the user of the remote controller.

3. The method of claim 1, wherein the usage condition comprises a programmed usage pattern associated with use of the remote controller and prior to detecting the occurrence of the usage condition further comprising:
defining a plurality of programmed usage patterns, with each programmed usage pattern having an associated programmed period of time after which the remote controller automatically enters the power saving mode following the occurrence of the programmed usage pattern; and
storing the plurality of programmed usage patterns in a storage element of the remote controller.

4. The method of claim 3, wherein defining and storing the plurality of programmed usage patterns occurs prior to use of the remote controller by the user.

5. The method of claim 1, wherein the usage condition comprises a programmed usage pattern associated with use of the remote controller, further comprising:
a user pressing a key of a user interface of the remote controller associated with a programmed usage pattern of a plurality of programmed usage patterns of the remote controller, wherein the programmed usage pattern associated with the pressed key has a defined period of time after which the remote controller automatically enters the power saving mode following the occurrence of the programmed usage pattern; and
the remote controller automatically entering the power saving mode following the defined period of time after the user performs the programmed usage pattern.

6. The method of claim 1, wherein the usage condition comprises a customized usage pattern associated with use of the remote controller and prior to detecting the occurrence of the usage condition further comprising:
defining a plurality of customized usage patterns based upon usage of the remote controller by one or more users, with each customized usage pattern being dynamically defined based upon actual usage of the remote controller by one or more users and having an associated period of time after which the remote controller automatically enters the power saving mode following the occurrence of one or more of the customized usage patterns.

7. The method of claim 6, further comprising storing the plurality of customized usage patterns in a storage element of the remote controller.

8. The method of claim 6, further comprising the remote controller recognizing at least one customized usage pattern of the plurality of customized usage patterns from usage of the remote controller by a user and after a period of time defined by the recognized customized usage pattern, the remote controller automatically entering the power saving mode.

9. The method of claim 6, further comprising a user of the remote controller defining one or more customized usage patterns of the plurality of customized usage patterns based upon usage of the remote controller by the user.

10. The method of claim 9, further comprising the user mapping the one or more customized usage patterns based upon usage of the remote controller by the user to one or more corresponding function elements of the remote controller.

11. The method of claim 10, wherein the function element comprises one or more keys of the remote controller.

12. The method of claim 1, wherein the exit condition comprises at least one of a press of a key of the remote controller and motion of the remote controller detected by a motion sensor of the remote controller.

13. The method of claim 1, wherein during the power saving mode, functionality of the remote controller is less than functionality of the remote controller when not in the power saving mode.

14. The method of claim 1, wherein the remote controller supports a bi-directional communication during a normal operational mode and wherein during the power saving mode, the remote controller does not support the bi-directional communication.

15. A remote controller, comprising:
a user interface through which a user may remotely control operation of an electronic device;
a processor and control element that processes instructions received from the user via the user interface and generates control signals suitable to control the electronic device from the received instructions;

a receiver that receives signals from the electronic device and provides those received signals to the processor and control element; and a transmitter that transmits the control signals to the electronic device as controlled by the processor and control element;

wherein in response to detecting a usage condition associated with use of the remote controller by one or more users, the processor and control element causes the remote controller to automatically enter a power saving mode a predetermined period of time determined by the detected usage condition matching one of a plurality of dynamically defined usage patterns each correlated to a corresponding selected predetermined period of time, and wherein upon detection of an exit condition, the processor and control element causes the remote controller to exit from the power saving mode, wherein the usage condition comprises one of a plurality of usage patterns each associated with one or more users of the remote controller and characterized in that the predetermined period of time of the usage condition is associated with the usage of the remote controller by the one or more users.

16. The controller of claim 15, wherein the usage condition of the remote controller is detected by interaction of the user with the user interface.

17. The controller of claim 16, wherein the usage condition comprises one or more of the user pressing a key of the user interface of the remote controller with the predetermined period of time determined by a function of the key pressed by the user, a last key press of the user interface made by the user of the remote controller with the predetermined period of time occurring after the last key press made by the user is detected, the user pressing a sequence of keys of the user interface of the remote controller, the user pressing at least one of one or more trigger keys of the user interface of the remote controller, the user waiting at least a predetermined elapsed time between pressing one or more keys of the user interface of the remote controller, and the time of day the user uses the remote controller.

18. The controller of claim 15, wherein the usage condition is satisfied by programming viewed by the user of the remote controller.

19. The controller of claim 15, wherein the usage condition comprises a programmed usage pattern of one or more programmed usage patterns stored in a storage element of the remote controller, with each programmed usage pattern having an associated programmed period of time after which the remote controller automatically enters the power saving mode following the occurrence of the programmed usage pattern.

20. The controller of claim 15, wherein the usage condition comprises a programmed usage pattern of one or more programmed usage patterns having a defined period of time, with each programmed usage pattern is associated with a corresponding element of the user interface of the remote controller, and wherein upon the user activating the corresponding element of the user interface and the occurrence of the programmed usage pattern, the processor and control element causes the remote controller to automatically enter the power saving mode.

21. The controller of claim 15, wherein the usage condition comprises a customized usage pattern of a plurality of customized usage patterns dynamically defined by the processor and control element based upon actual usage of the remote controller by one or more users and having an associated period of time after which the processor and control element causes the remote controller to automatically enter the power saving mode following the occurrence of the customized usage pattern.

22. The controller of claim 21, wherein the remote controller further comprises a storage element and the plurality of customized usage patterns are stored in the storage element.

23. The controller of claim 21, wherein the processor and control element recognizes the customized usage pattern from usage of the user interface of the remote controller by the user and causes the remote controller to automatically enter the power saving mode a period of time associated with the recognized customized usage pattern.

24. The controller of claim 21, wherein the user defines the plurality of customized usage patterns based upon usage of the remote controller by the user.

25. The controller of claim 24, wherein the user interacts with the user interface to map one or more of the plurality of customized usage patterns to one or more corresponding function elements of the remote controller.

26. The controller of claim 25, wherein the one or more corresponding function elements are one or more keys of the user interface.

27. The controller of claim 15, wherein the exit condition comprises at least one of a press of a key of the user interface by the user and motion of the remote controller detected by a motion sensor, with the motion sensor being in cooperative arrangement with the processor and control element.

28. The controller of claim 15, wherein during the power saving mode, the processor and control element causes functionality of the remote controller to be less than when not in the power saving mode.

29. The controller of claim 28, wherein the remote controller supports bi-directional communication during a normal operational mode and wherein during the power saving mode, the processor and control element causes the remote controller to not support bi-directional communication.

\* \* \* \* \*